United States Patent [19]

Dalby

[11] Patent Number: 5,024,549
[45] Date of Patent: Jun. 18, 1991

[54] METHOD AND APPARATUS FOR JOINING STRUCTURAL MEMBERS

[75] Inventor: James F. Dalby, Reston, Va.

[73] Assignee: MRJ Group, Inc., Oakton, Va.

[21] Appl. No.: 372,802

[22] Filed: Jun. 28, 1989

[51] Int. Cl.[5] .................................. F16D 1/00
[52] U.S. Cl. ............................ 403/404; 403/28; 285/381
[58] Field of Search ............... 403/404, 28, 32; 285/381; 292/DIG. 66; 411/909

[56] References Cited

U.S. PATENT DOCUMENTS

| 3,744,832 | 7/1973 | Casey et al. | 292/DIG. 66 |
| 4,022,519 | 5/1977 | Hill | 411/909 X |
| 4,489,964 | 12/1984 | Kipp et al. | 285/381 X |
| 4,596,483 | 6/1986 | Gabriel | 403/404 X |
| 4,621,884 | 11/1986 | Kipp et al. | 285/381 |
| 4,753,465 | 6/1988 | Dalby | 292/DIG. 66 |

Primary Examiner—Andrew V. Kundrat
Attorney, Agent, or Firm—Francis L. Masselle

[57] ABSTRACT

Permanent joinder of structural components is accomplished by means of a heat retractable member connected between them by mechanically interlockable elements and raising the temperature of the member to a value sufficient to cause retraction thereof.

5 Claims, 1 Drawing Sheet

METHOD AND APPARATUS FOR JOINING STRUCTURAL MEMBERS

This invention relates generally to the fabrication of large and/or massive structures and, more particularly, to methods and apparatus for permanent joinder of structural components of complex surface configuration.

BACKGROUND OF THE INVENTION

In the construction of submarines as well as surface ships, large aircraft and space craft (including space stations), it is frequently necessary to attach massive or awkward pieces of equipment permanently to complex, i.e., non-planar support structures: to attach lighter-weight equipment to complex surfaces in very tight quarters: or a combination of the two requirements, viz., attaching heavy equipment to complex support structures in confined spaces.

The problem is particularly acute in connection with the fabrication of large structures such as a space station while in earth orbit where it is compounded by such considerations as the need to conserve astronaut energy and to minimize the weight of tools and avoid the need for jigs and fixtures which would augment the load to be lifted into orbit. In any event, whether in space or on earth it is not always possible to maneuver sufficiently to attach retaining nuts to bolts extending from the complex- surface support through the equipment or object.

The invention capitalizes on the ability of certain metal alloys (hereinafter sometimes referred to as "shape-memory alloys" and described in detail) after having been conditioned to recall a particular dimensional configuration and then distorted from that configuration to revert to that configuration upon heating to above a critical (transition) temperature.

The basic general object of the invention to provide methods and apparatus for permanently joining structural components without the use of conventional fasteners of any sort.

A concomitant of this general object is the elimination of the possibility for parts mismatch, lost parts, jamming of parts, or loosening of the joined components due to vibration or other causes.

Another object of the invention is the provision of methods and apparatus for joining structural components which requires only a single active element and can be carried out by remote control.

BRIEF DESCRIPTION OF THE INVENTION

To the fulfillment of these and other objects which will become apparent as this description proceeds, the invention contemplates a method of permanently joining structural components in which one such component is provided with a heat retractable member projecting from its surface and having at its free end one of a pair of disengageable mechanically interlockable elements. The other of the components is provided with the other of the pair of interlockable element and the components placed in confronting relation with the elements loosely engaged. The heat retractable element is then heated to cause its retraction, drawing the components into permanent abutment.

The apparatus contemplated by the invention comprises a pair of disengageable, mechanically interlockable elements one of which is elongate and fabricated of heat retractable material. Each of the elements is integral with or adapted to be secured to a respective one of the components to be joined. Heating means are associated with the heat retractable element for raising its temperature sufficiently to cause its retraction to draw the components into abutment.

DESCRIPTION OF A PREFERRED EMBODIMENT

Shape-memory alloys have been known for many years and have been put to a variety of uses. For the most part past applications of these alloys have been in the context of a substitute for electromechanical transducers such as bi-metallic elements, piezoelectric bimorphs and the like. The advantage of the memory alloys over the devices they can replace is their ability to generate much larger mechanical forces when actuated to return to the remembered dimensional configuration. One such application is described in my prior U.S. Pat. No. 4,753,465 to which reference may be had for additional information on memory alloys and which is hereby expressly incorporated by reference.

At this juncture, suffice it to say that a rod or other elongated member fabricated of Nitinol or other shape memory material properly conditioned as will be described presently is heat retractable, i.e., will decrease in length on the application of heat sufficient to raise the temperature of the material to a value above its transition temperature. In an application such as contemplated by the present invention an appropriately designed and conditioned member exhibits a reduction in length ranging up to about 8% and a contractive force of about 80,000 pounds per square inch (psi).

Figure 1:
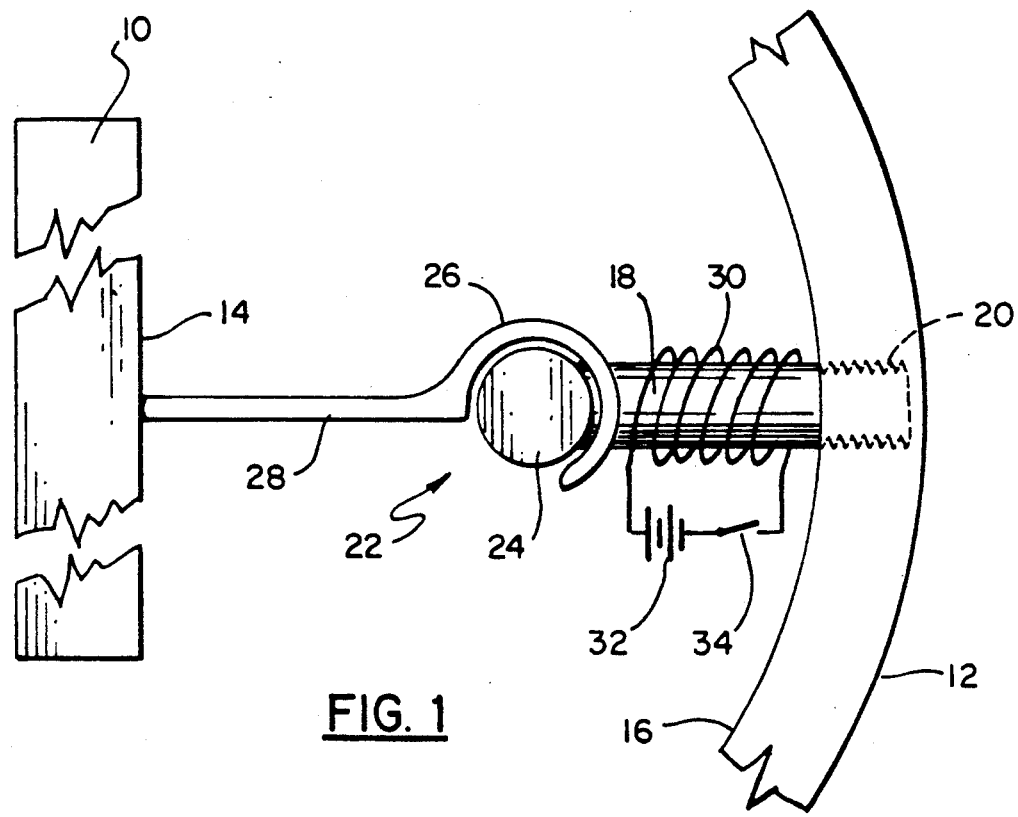
FIG. 1 is a diagrammatic view in elevation of apparatus embodying the invention.

Referring to the drawings, and first in particular to FIG. 1, the method and apparatus embodying the invention will be described with respect to permanently joining two structural components shown fragmentally at 10 and 12. It will be understood that components 10 and 12 are disposed in confronting relation and intended to be permanently joined with their apposed surfaces 14 and 16 in abutment. It will be further understood that, if members 10 and 12 were shown in their respective entireties, the regions of surfaces 14, 16 intended for abutment would be relatively closely spaced at the start of the joining process.

Structural component 12 is provided with a heat retractable member 18, which in the illustrated embodiment takes the form of a solid cylindrical rod, projecting from its surface 16. Member 18 may be an integral part of component 12 but in most cases would be secured thereto by screw action as shown or other suitable means. In the FIG. 1 embodiment, member 18 has one end 20 threaded and screwed into a tapped bore in surface 16 in the manner of a stud.

Figure 2:
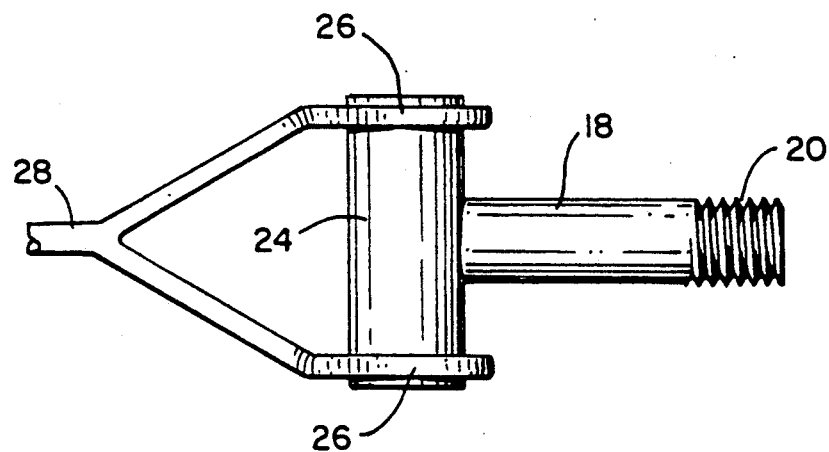
FIG. 2 is a diagrammatic plan view of the mechanically operative elements of the apparatus shown in FIG. 1, the electrical portions thereof being omitted.

At its distal end, member 18 carries one of a pair of disengageable, mechanically interlockable elements. While the interlockable elements may take a variety of forms, the one shown by way of example consists of a hook and cross bar connection 22. To this end, heat retractable member 18 terminates in a transverse bar 24. The other element of the pair, hook 26, is fixed to or integral with structural component 10. Actually hook 26 is one of two joined in a Y-configuration to a single draw-bar 28 projecting rom surface 14 as shown in FIG. 2. The hooks engage the cross bar 24 on either side of heat retractable member 18.

Heating means are provided which, when activated raise the temperature of the shape memory member to a temperature in excess of the transition value for the particular alloy to cause contraction thereof. For Nitinol 55, a preferred composition comprising 55% nickel and 45% titanium the transition temperature is in the range 290°-310° F. and the heat activating temperature is preferably in the range 320°-360° F., more preferably 330°-350° F. The temperature differential between the upper end of the transition temperature range and the activating temperature employed affects the rate of contraction of the memory element.

In the preferred embodiment, heating of retractable member 18 is accomplished by means of electrical heating coils 30 encircling the member over at least a major portion of its length and supplied with an electrical heating current from any suitable source represented symbolically at 32 in series with a control switch 34 for turning on the current when desired. In space applications or other uses where failure of the electrical heating system might be catastrophic, a redundant system may be employed.

While an electrical heating system lends itself admirably to the described application where a source of electric power is available, other means of heating the rod can be used such as, for example, the heat from an exothermal chemical reaction, including combustion.

In operation, the components 10 and 12 are disposed with their respective surfaces 14 and 16 in confrontation and the hooks loosely engaging cross bar 24. As previously mentioned, in this disposition the regions of the confronting surfaces which are to be in abutment when the assembly is complete are spaced from each other by a distance no greater, and preferably somewhat smaller, than the difference between the starting length and contracted length of member 18. With the components so positioned, the switch 34 is closed to energize heating coils 30. When the transition temperature is exceeded member 18 contracts, drawing the components together and into abutment with a force ranging up to about 80,000 psi. In some, perhaps most applications, the distance between the abutable surfaces is somewhat less than the contraction in length of rod 18 so that the rod is slightly stretched. In any event, when contraction of member 18 is complete the structural components are permanently united as effectively as if they were welded or joined by other conventional means such as bolting or riveting.

Heat retractable member preferably is fabricated of Nitinol 55, previously mentioned. The length of the member at the start of manufacture is no greater than, and in most cases at least minutely less than, the distance between surfaces 14,16 at the location of the member relative to components 10,12 at the completion of the joining process. The member is then annealed as described in the aforementioned patent and stretched to produce a permanent strain no greater than 8% the retraction strain corresponding to the maximum stress generated. The member is then ready for installation and use as already described.

What is claimed is:

1. A method of permanently joining structural components comprising:
   (a) providing on the surface of one of said components a member projecting from said surface and having at its free end one of a pair of disengageable mechanically interlockable elements, said member being composed of heat retractable material;
   (b) providing on the other of said components the other of said pair of disengageable mechanically interlockable elements;
   (c) disposing said components in confronting relation with said interlockable elements engaged; and
   (d) heating said heat retractable projecting member whereby the resultant contraction of said member draws said components into predetermined permanent abutment.

2. Apparatus for permanently joining structural components, comprising:
   (a) a pair of disengageable, mechanically interlockable elements one of which is of elongated configuration and fabricated of a heat retractable material, each of said elements being integral with or adapted for securement to a respective structural component to be joined; and
   (b) means for heating said one element to a temperature sufficiently high to cause retraction thereof.

3. Apparatus according to claim 2 wherein said one element is a rod of Nitinol which has been heated to a temperature in excess of its transition temperature, cooled and then stretched a predetermined percentage of its length.

4. Apparatus according to claim 3 wherein one end of said rod is threaded and the other end terminates in a transverse bar.

5. Apparatus according to claim 4 wherein said other element terminates in at least one hook adapted to engage said transverse bar.

* * * * *